(12) United States Patent
Campo et al.

(10) Patent No.: US 8,275,517 B2
(45) Date of Patent: Sep. 25, 2012

(54) CONTROL ASSISTING SYSTEM FOR A MOTOR VEHICLE

(75) Inventors: Marc Campo, Chatillon (FR); Sebastien Lefranc, Verrieres-le-Buisson (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 1192 days.

(21) Appl. No.: 12/091,057

(22) PCT Filed: Oct. 18, 2006

(86) PCT No.: PCT/FR2006/051056
§ 371 (c)(1),
(2), (4) Date: Apr. 21, 2008

(87) PCT Pub. No.: WO2007/045796
PCT Pub. Date: Apr. 26, 2007

(65) Prior Publication Data
US 2008/0275608 A1    Nov. 6, 2008

(30) Foreign Application Priority Data

Oct. 19, 2005  (FR) ...................................... 05 10661

(51) Int. Cl.
*B62D 6/00*    (2006.01)
(52) U.S. Cl. .......................................... 701/41; 180/443
(58) Field of Classification Search ................. 180/443, 180/446; 701/41, 42
See application file for complete search history.

(56) References Cited

U.S. PATENT DOCUMENTS

| | | | | |
|---|---|---|---|---|
| 1,961,844 A | * | 6/1934 | Clark | 200/61.31 |
| 4,781,262 A | * | 11/1988 | Nakamura et al. | 180/414 |
| 4,909,343 A | * | 3/1990 | Mouri et al. | 180/422 |
| 5,668,722 A | * | 9/1997 | Kaufmann et al. | 701/41 |
| 5,828,972 A | * | 10/1998 | Asanuma et al. | 701/41 |

(Continued)

FOREIGN PATENT DOCUMENTS

EP    0800980 A    10/1997

(Continued)

OTHER PUBLICATIONS

International Search Report mailed Feb. 27, 2007 in PCT/FR2006/051056.

*Primary Examiner* — Lesley D Morris
*Assistant Examiner* — Maurice Williams
(74) *Attorney, Agent, or Firm* — Nicolas E. Seckel

(57) ABSTRACT

The inventive control-assisting system for a motor vehicle comprises a power steering (1) associated with a steering wheel (2) and a power steering actuator (3) whose operation is controlled by a data processing unit (4) for applying power torque to the vehicle steering and is characterized in that said data processing unit (4) is connected to means (5) for controlling the power steering (1) return to at least one predetermined position by computing a return torque according to a disturbance rejection torque corresponding to a resistance torque applied to the steering system and to a reference torque corresponding to a torque required for controlling the steering wheel rotation.

10 Claims, 4 Drawing Sheets

U.S. PATENT DOCUMENTS

| | | | |
|---|---|---|---|
| 5,881,836 A | 3/1999 | Nishimoto et al. | |
| 6,039,144 A * | 3/2000 | Chandy et al. | 180/446 |
| 6,050,360 A * | 4/2000 | Pattok et al. | 180/446 |
| 6,450,287 B1 * | 9/2002 | Kurishige et al. | 180/446 |
| 7,481,294 B2 * | 1/2009 | Fujita et al. | 180/446 |
| 7,810,608 B2 * | 10/2010 | Goto et al. | 180/446 |
| 2003/0121716 A1 * | 7/2003 | Yamada et al. | 180/446 |
| 2004/0061465 A1 * | 4/2004 | Matsuoka | 318/432 |
| 2004/0074268 A1 * | 4/2004 | Wu | 70/209 |
| 2004/0182626 A1 * | 9/2004 | Katou et al. | 180/226 |
| 2005/0049769 A1 * | 3/2005 | Tsuchiya | 701/41 |
| 2005/0109556 A1 * | 5/2005 | Kubota et al. | 180/446 |
| 2005/0121252 A1 * | 6/2005 | Tsuchiya | 180/446 |
| 2005/0279562 A1 * | 12/2005 | Hara et al. | 180/446 |
| 2007/0029129 A1 * | 2/2007 | Shiozawa et al. | 180/402 |
| 2008/0249685 A1 * | 10/2008 | Hara et al. | 701/42 |
| 2009/0192679 A1 * | 7/2009 | Kobayashi et al. | 701/42 |

FOREIGN PATENT DOCUMENTS

| | | |
|---|---|---|
| EP | 1319575 A | 6/2003 |
| JP | 10316005 A | 12/1998 |

* cited by examiner

CONTROL ASSISTING SYSTEM FOR A MOTOR VEHICLE

REFERENCE TO PRIOR APPLICATION

This international application claims priority of French patent application filed on Oct. 19, 2005 under No. 05 10 661, whose description, drawings and claims are all incorporated by reference into the present application.

TECHNICAL FIELD

The present invention concerns a system for assisting control of a motor vehicle.

More particularly, the invention concerns an assistance system of the type having power steering associated to a steering wheel and to a power steering actuator, whose operation is controlled by a data processing unit to apply an assisting torque to the steering of the vehicle.

BACKGROUND ART

In the course of the past thirty years, the motor vehicle industry has benefited from technological progress in the field of electronics. Systems that used to be purely mechanical are now made up using knowledge in various fields of mechanics, hydraulics, and electronics, these various systems being known, for example, as "mechatronics systems." These "mechatronics systems" make it possible to increase very markedly the performances of the vehicle for an advanced command.

Among these "mechatronics systems," wheel anti lock brake systems or ABS systems can be mentioned, which prevent wheels from blocking during braking phases of the vehicle. By avoiding this blocking, the tires can then generate a higher braking force and thus optimize the braking distance of the vehicle.

Steering systems of vehicles have also been improved. Historically, hydraulic assistance has first made it possible to reduce the amount of force that the driver must provide to the steering wheel. Presently, the electric power steering named "EPS system" tends to replace this hydraulic power steering technology.

Futures innovations will concern in particular systems that make it possible to add torque to the power column (Torque Overlay), thus making it possible to assist the driver in certain situations by orienting the steering wheel, steer-by-wire control systems in which there is no longer a mechanical link between the steering wheel and the wheels, and where only electrical data is transported by an electrical bus, etc. In the area of these new technologies, systems of the "EFS", activation of electrical or hydraulic steering, or "steer-by-wire" type offer a new degree of freedom which is a new parameter in the adjustment of the ground connection functions of the vehicle.

This degree of freedom makes it possible to add torque to the steering column, which makes it possible, either to vary the driving torque, or to effect auto-rotation of the steering wheel, which was impossible with only a hydraulic power steering system. This new function makes it possible, then, to improve the performances of the vehicle in many life situations, such as, in particular, compensation of lateral pull, "split-mu" braking assistance, etc., but also during maneuvering of the vehicle at low speed, where it is then possible to help the driver so that he needs to provide less work to the steering wheel to carry out the maneuvers.

The main function of a motor vehicle power steering system is to turn the steered wheels, for example, the front wheels of the vehicle, in order to steer the vehicle. This is usually carried out from a steering wheel, a steering column, a pinion, a rack, and tie rods. In order to reduce the effort in the area of the steering wheel, power steering systems have been introduced. These used to be hydraulic systems because of the power needed. However, nowadays, small high-power electric motors are starting to appear. Power steering is thus shifting to electric systems called "EPS systems." The wheels are still mechanically linked to the steering wheel and any rotation of the steering wheel causes the steered wheels of the vehicle to turn.

PRESENTATION OF THE INVENTION

The goal of the invention is to further simplify the controls during low speed maneuvering of a vehicle.

To this effect, an object of the invention is a system for assisting maneuvers of a motor vehicle, of the type having a power steering system, associated to a steering wheel and to a power steering actuator, whose operation is controlled by a data processing unit to apply an assisting torque to the steering system of the vehicle, characterized in that it comprises means for controlling the return of the steering system into at least one predetermined position connected to the data processing unit, said control means comprising means for calculating a return torque from a disturbance rejection torque corresponding to the resistance torque applied by the steering system and from a setpoint torque corresponding to the torque required to control the rotation of the steering wheel.

According to other characteristics:

a predetermined position is a central position of the steering system in which the steered wheels of the vehicle are aligned in a straight line;

a predetermined position is a stop position of the steering system in which the wheels of the vehicle are turned;

the control means comprise means for acquiring the speed of the vehicle to trigger the return of the steering system into a predetermined position if the speed of the vehicle is lower than a predetermined threshold value;

the control means comprise the means for acquiring the speed of the vehicle to trigger the return of the steering system into a predetermined position if the speed of the vehicle is zero;

the control means comprise means for acquiring the torque applied by the driver to the steering wheel to activate the return of the steering system into a predetermined position if the driver does not apply a torque to said steering wheel;

the control means comprise means for acquiring the torque applied by the driver to the steering wheel to deactivate the return of the steering system into a predetermined position if the driver takes a hold of the steering wheel again;

the system comprises activation/deactivation means connected to the data processing unit and adapted to activate/deactivate the means for controlling the return of the steering system;

the means for controlling the return of the steering system comprise means for monitoring the predetermined position in which the steering system is intended to be returned;

the disturbance rejection torque is calculated mainly from the data of the steering wheel torque and total torque applied by the actuator; and the means for controlling the return of the steering system comprise means forming adder to supply the return torque from the disturbance rejection torque and the setpoint torque.

BRIEF DESCRIPTION OF THE DRAWINGS

Other advantages and characteristics of the invention will appear upon reading the following description of embodiments made in reference to the annexed drawings in which.

MANNER OF IMPLEMENTING THE INVENTION

Figure 1:
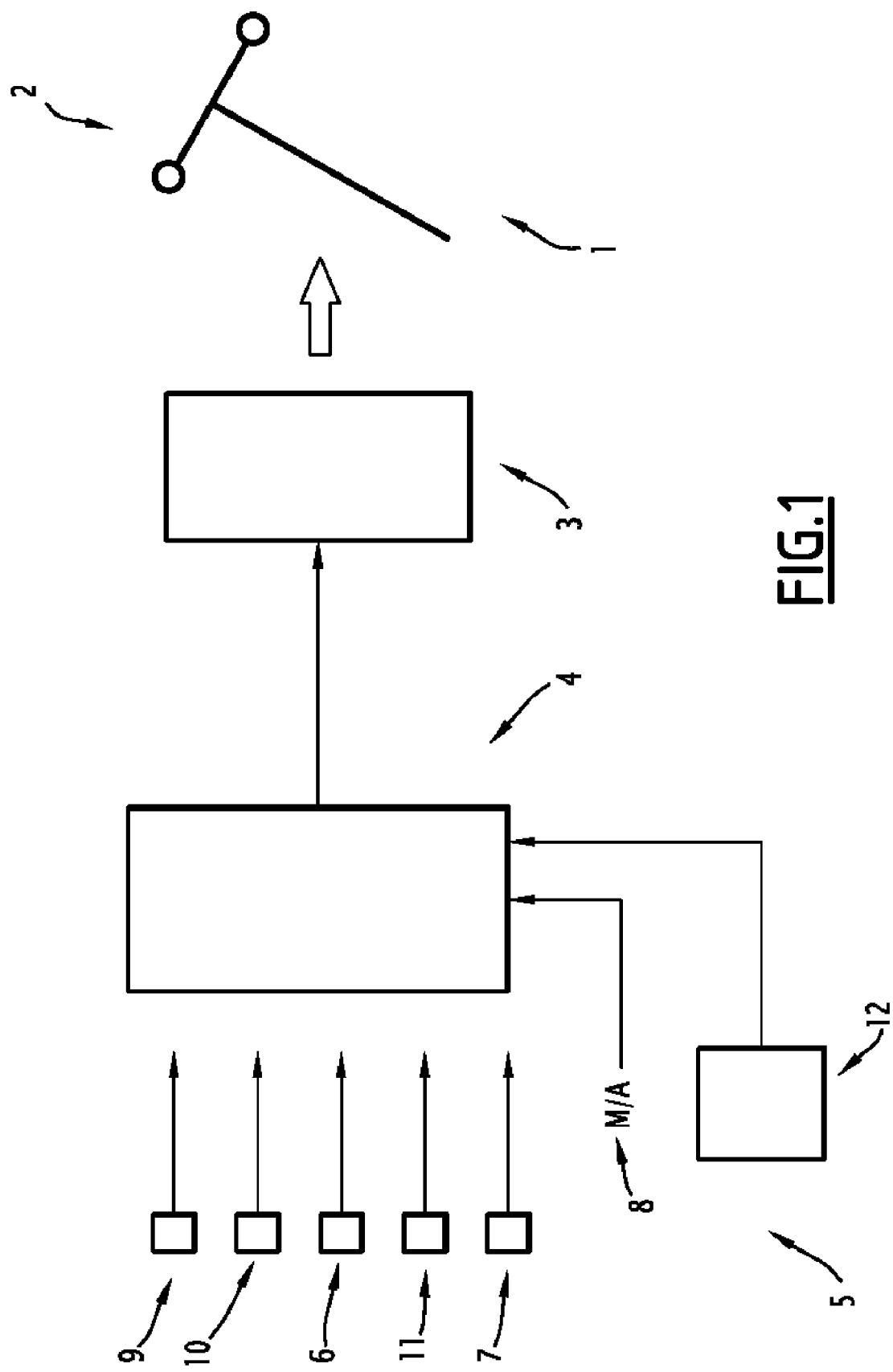
FIG. 1 is a synoptic schematic graph illustrating the general structure of an assistance system according to the invention.

That is, FIG. 1 illustrates a system for assisting maneuvering of a motor vehicle that has a power steering system designated by the general reference 1 on this Figure, associated with a steering wheel designated by the general reference 2 and to a power steering actuator designated by the general reference 3, whose operation is controlled by a data processing unit designated by the general reference 4 to apply an assisting torque to the steering system of the vehicle.

As has been indicated above, the power steering actuator 3 can be, for example, an assisting electrical motor.

According to the invention, the data processing unit 4 is connected to means 5 for controlling the return of the steering system to at least one predetermined position; the goal of the invention being to cause the steering system 1, and thus, the steered wheels and the steering wheel 2, to turn, without the driver having to touch the steering wheel 2.

These control systems 5 can control, for example, the return of the steering system 1 to a central position thereof, in which the wheels of the vehicle are aligned in a straight line. Of course, the control means 5 can control the power steering system to return to a position other than the central position, such as, for example, a stop position of the steering system in which the wheels of the vehicle are turned.

The control means 5 can also control the return of the steering system 1 to the central position or to the stop position. In this case, the control means 5 comprise means 12 for monitoring the predetermined position, in order to allow the driver to choose between the two positions. The driver acts on these monitoring means 12, which are provided in the form of a human/machine interface, to drive the data processing unit 4 as a function of his wishes for controlling how the steering system is turned.

The control means 5 have means for acquiring the speed 6 of the vehicle, to trigger the return of the steering system to a predetermined position, if the speed of the vehicle is lower than a predetermined threshold value, which is set, for example, at 30 km/h. More particularly, the return of the steering system 1 is activated for a speed of the vehicle from zero to the threshold value, here, 30 km/h, and the return is deactivated when the speed of the vehicle is above 30 km/h.

The control means also comprise means for acquiring the torque 7 applied by the driver to the steering wheel to trigger the return of the steering system if the driver does not apply a torque to the steering wheel. The control means 5 also comprise the means 6 for acquiring the torque applied by the driver to the steering wheel 2 to deactivate the return of the steering system if the driver takes a hold of the steering wheel 2 again, while this return is in process.

These torque and speed data are then supplied from corresponding torque and speed sensors.

It is understood, then, that in this case, when the speed of the vehicle is lower than 30 km/h and the driver does not apply any torque to the steering wheel, the system makes it possible to return the steering system to the central position, i.e., to return the wheels in the aligned position.

The data processing unit is connected to means 8 for activating/deactivating (on/off) of the corresponding function. These activation/deactivation means 8 are thus adapted to activate/deactivate the means 5 for controlling the return of the steering system. These activation/deactivation means 8 are driven, for example, by the driver. In this case, these means 8 can be formed, in a non-limitative manner, by an on/off button of the steering wheel return function, of a device connected to stopping or locking of the vehicle, in order to activate the control means 5 once the vehicle has stopped or has been locked.

Similarly, the data processing unit is also connected to other sensors to automatically control the return.

Thus, for example, when this data processing unit is also connected to a steering wheel angle sensor, designated by the general reference 9, the speed of movement of the steering wheel is designated by the general reference 10 and the total actuator torque is designated by the general reference 11.

It is understood, then, that such a system makes it possible to simplify the controls, in particular during maneuvers of the vehicle at low speed, and to use new interfaces to simplify the use of the vehicle by its driver.

The system then uses, for example, the power steering motor to cause the steering wheel, and thus the wheels, to turn, without the driver touching the steering wheel. The objective of the invention is thus to reduce the work the conductor must provide when maneuvering at low speed.

Figure 2:
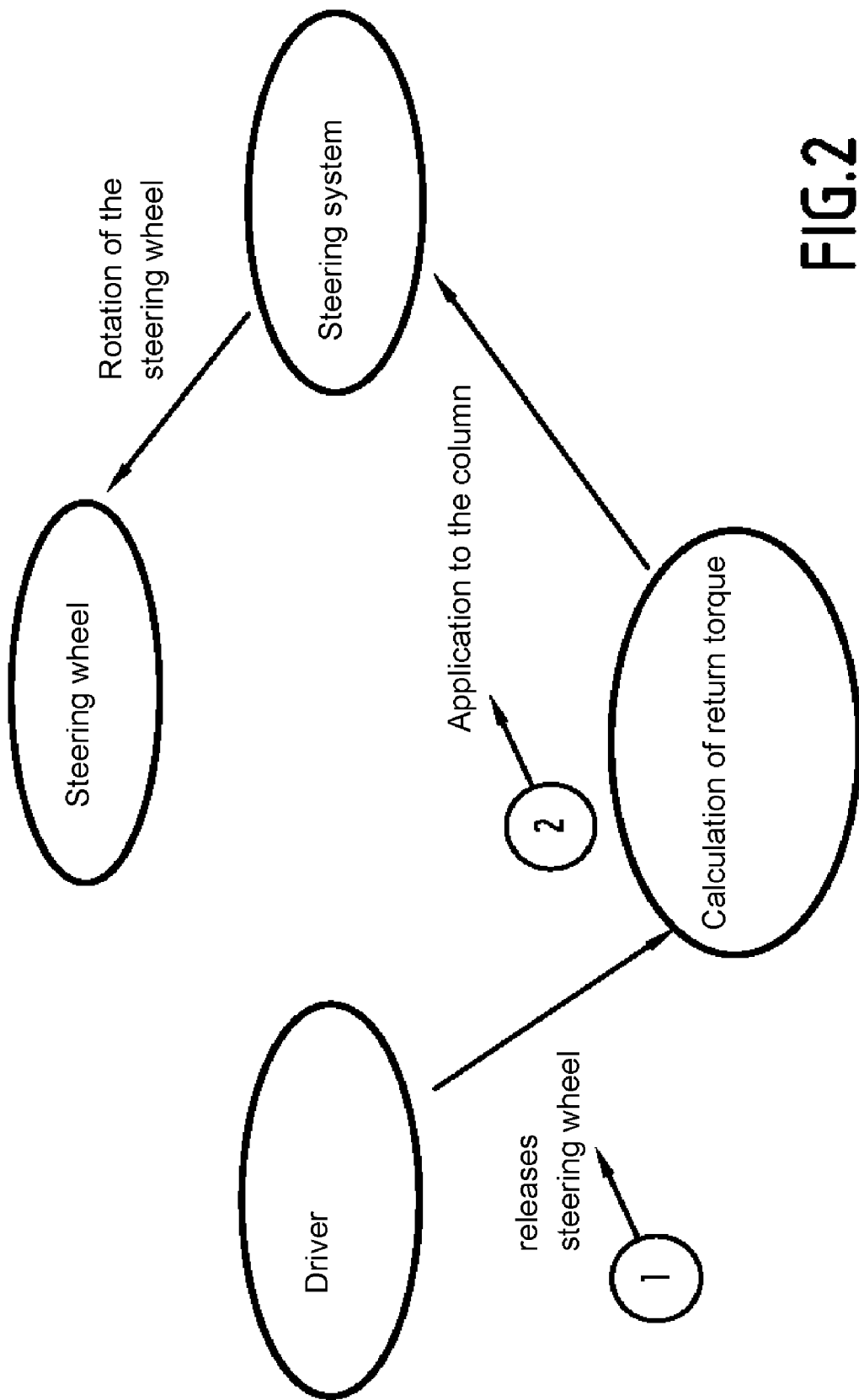
FIG. 2 illustrates the operation of this system.

This is illustrated, for example, on FIG. 2, on which it can be observed that the control means are adapted to calculated a return torque when the driver of the vehicle releases the steering wheel and the speed of the vehicle is lower than, for example, the predetermined threshold value of 30 km/h.

This torque is then applied to the column and to the steering system to cause the steering wheel to turn, and thus, to bring the wheels into the predetermined position.

During maneuvering at low speed with systems of the state of the art, comprising, for example, a vehicle speed of zero, the time of auto-alignment of the steered wheel set of the vehicle is very low because the speed of the vehicle is low. This auto-alignment thus cannot bring the steering wheel back to the center, because its effect is very markedly lower than the slippage torque of the tires. For this reason, at zero speed, when the driver releases the steering wheel, the steering wheel remains in position after a slight oscillation caused by the torsional torque of the tires.

Figure 3:
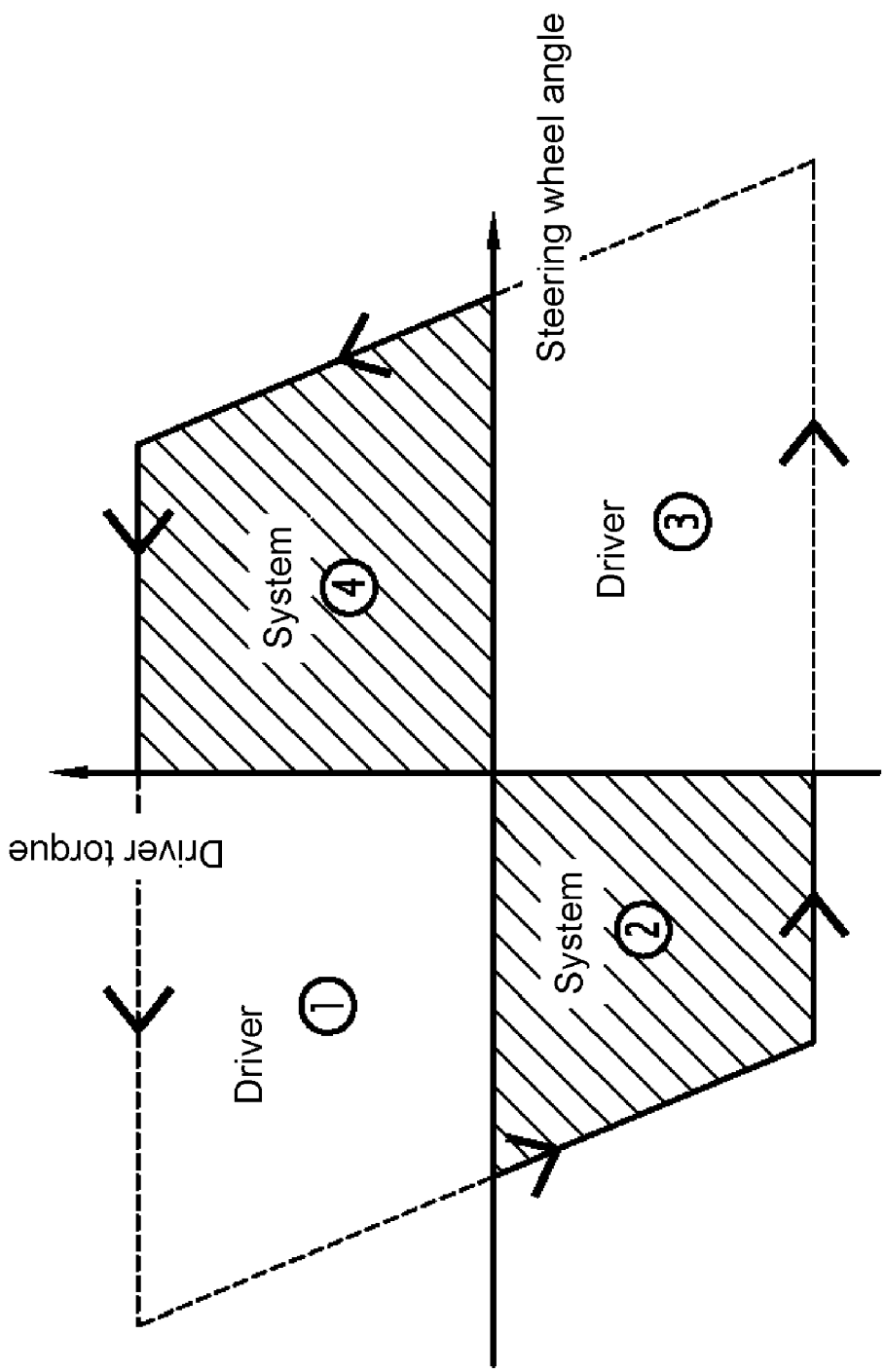
FIG. 3 is a graph showing the improvements that have been provided.

During maneuvering at low speed, the driver thus works in the four quadrangles illustrated on FIG. 3, which illustrates the relationship driver torque/steering wheel angle.

He must then bring his steering wheel back toward the center during maneuvering in the illustrated quadrangles 2 and 4.

The system according to the invention, by using the steering system to add torque to the column, and thus, to return the steering wheel toward the center when the driver releases it, thus allows the driver to work only in the negative quadrangles 1 and 3, which divides his work at the wheel by two.

When the vehicle is stopped, in particular after a parking maneuver, the control means 5 are activated and control the return of the steering wheel to a predetermined position, advantageously, the central position. That is, when the speed of the vehicle is zero, and when the driver releases his steering wheel 2, the steered wheels (and thus, the steering wheel 2) remain in position because of the strong slippage torque of the tires. With control means 5 according to the invention, the steering wheel 2 returns to the central position without any special effort by the driver.

As has been indicated above, the system can be driven through a human/machine interface, i.e., for example, control buttons, or it can be present permanently in the vehicle.

The data processing unit integrated into the system according to the invention then uses the steering wheel angle, steering wheel speed, steering wheel torque and total power steering actuator torque data.

From the steering wheel torque data, the system detects in a continuous manner whether the driver holds the steering wheel or not. If the driver releases the steering wheel in the targeted range of speeds, comprised, for example, between 0 and 30 km/h, then the system calculates a return torque from the steering wheel angle, steering wheel speed, steering wheel torque and total power steering actuator torque data to makes it possible to return the steering wheel toward the center.

If the driver takes a hold of the steering wheel again, then the system cuts the additional torque in a continuous manner. The calculation of the return torque in a situation where the steering wheel is released is illustrated on FIG. 4. Actually, this return torque applied to the steering column by the actuator can be decomposed as the sum of two distinct and homogeneous torques.

Figure 4:
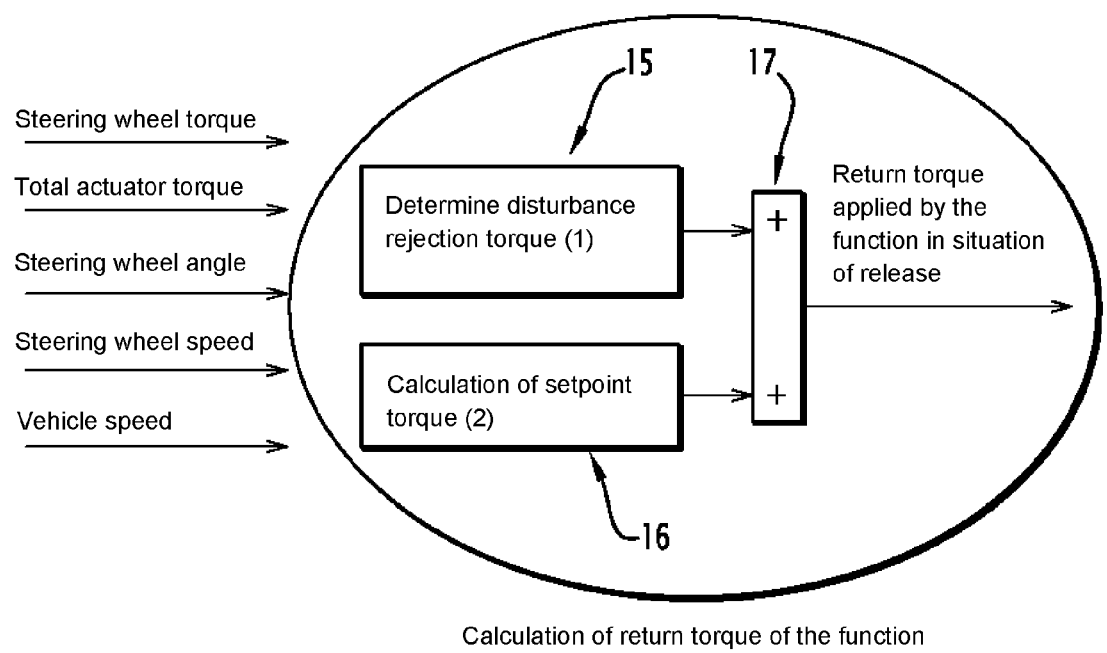
FIG. 4 illustrates the calculation of the return torque.

One of the torques is a so-called disturbance rejection torque designated by the general reference 15 on this FIG. 4, which corresponds to the resistance torque applied by the steering system. This resistance torque then corresponds to the rack forces, to the equivalent inertia, to the dry and viscous frictions, etc. This torque is calculated mainly from the data of the steering wheel torque and of the total torque applied by the actuator. The steering wheel torque obtained if this torque is applied with a system according to the invention is thus zero.

The other torque is a so-called setpoint torque designated by the general reference 16 on this FIG. 4, which is equivalent to the torque required to drive the rotation of the steering wheel. This torque is thus equivalent to the measured steering wheel torque and it is independent from the conditions external to the steering system. Actually, the return torque can be calculated from data such as, for example, the steering wheel angle, the speed, etc., i.e., directly or through direct calculation, or through automatic control, i.e., indirectly.

The corresponding calculation means are then connected, as input, to the various detectors and sensors mentioned above, which makes it possible to obtain the steering wheel torque, the total actuator torque, the steering wheel angle, the steering wheel speed, the vehicle speed.

As output, these calculation means are connected to means forming adder designated by the general reference 17 on this FIG. 4, to supply, from these two torques, the return torque applied by the function in a situation where the steering wheel is released.

Of course, still other embodiments can be envisioned; this system ensuring a return of the steering system to a predetermined position, and thus, an angular driving of the direction (or a driving of the angular position of the steering wheel), in order to reduce the efforts of the driver and to bring the steered wheels of the vehicle precisely into the desired position.

The invention claimed is:

1. System for assisting maneuvers of a motor vehicle, of the type having a power steering system, associated to a steering wheel and to a power steering actuator, whose operation is controlled by a data processing unit to apply an assisting torque to the steering system of the vehicle,
   wherein said assistance system comprises means for controlling the return of the steering system into at least one predetermined position connected to the data processing unit, said control means comprising means for calculating a return torque from a disturbance rejection torque corresponding to the resistance torque applied by the steering system and from a setpoint torque corresponding to the torque required to control the rotation of the steering wheel,
   wherein the predetermined position is a stop position of the steering system, wherein in a central position of the steering system, the vehicle advances in a straight line, and in the stop position of the steering system, the wheels of the vehicle are turned away from the central position,
   wherein the control means comprise means for acquiring the speed of the vehicle to trigger the return of the steering system into the predetermined position if the speed of the vehicle is zero.

2. System according to claim 1, wherein another predetermined position is a central position of the steering system in which the steered wheels of the vehicle are aligned in a straight line.

3. System according to claim 2, wherein the control means triggers the return of the steering system into the other predetermined position if the speed of the vehicle is lower than a predetermined threshold value.

4. System according to claim 1, wherein the control means triggers the return of the steering system into the predetermined position if the speed of the vehicle is lower than a predetermined threshold value.

5. System according to claim 1, wherein the control means comprise means for acquiring the torque applied by the driver to the steering wheel to activate the return of the steering system into a predetermined position if the driver does not apply a torque to said steering wheel.

6. System according to claim 5, wherein the control means comprise means for acquiring the torque applied by the driver to the steering wheel to deactivate the return of the steering system into a predetermined position if the driver takes a hold of the steering wheel again.

7. System according to claim 1, wherein the system comprises activation/deactivation means connected to the data processing unit and adapted to activate/deactivate the means for controlling the return of the steering system.

8. System according to claim 1, wherein the means for controlling the return of the steering system comprise means for monitoring the predetermined position into which the steering system is intended to be returned.

9. System according to claim 1, wherein the disturbance rejection torque is calculated mainly from the data of the steering wheel torque and total torque applied by the actuator.

10. System according to claim 1, wherein the means for controlling the return of the steering system comprise means forming adder to supply the return torque from the disturbance rejection torque and the setpoint torque.

* * * * *